Sept. 16, 1969
C. A. RICHIE
3,466,705
APPARATUS FOR EXTRUDING FOAMABLE PLASTIC
MATERIALS IN TUBULAR FORM
Filed March 7, 1966
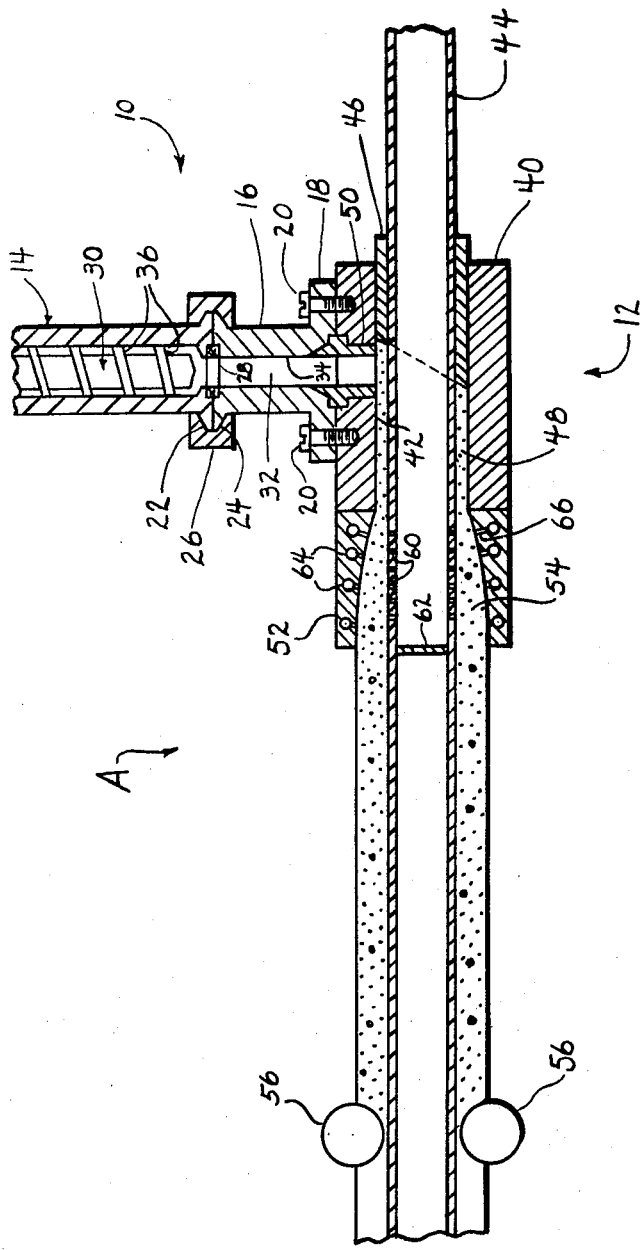
INVENTOR.
CARLTON A. RICHIE
BY Philip M. Rice
& W. A. Schaich

United States Patent Office

3,466,705
Patented Sept. 16, 1969

3,466,705
APPARATUS FOR EXTRUDING FOAMABLE PLASTIC MATERIALS IN TUBULAR FORM
Carlton A. Richie, Toledo, Ohio, assignor to Owens-Illinois, Inc., a corporation of Ohio
Filed Mar. 7, 1966, Ser. No. 532,409
Int. Cl. B29d 23/04
U.S. Cl. 18—14
2 Claims

ABSTRACT OF THE DISCLOSURE

Apparatus for producing tubular articles from foamable resins including an extrusion chamber having an annular extrusion orifice with an annular cross section that increases in area gradually in the direction of travel of the extruded material, and including means for introducing a foam augmenting fluid radially inwardly into the foamable material.

---

The present invention relates to the manufacture of cellular or foamed plastic materials of both the rigid and flexible types.

More particularly the invention relates to the manufacture of cellular or foam plastic materials in tubular form, usually in the form of a hollow cylinder or pipe.

THE PROBLEM

Cellular or foamed plastics including both thermoplastic and thermosetting resins are being used in increasing quantities as packaging materials, particularly for protecting fragile merchandise from breakage during shipping and storage. Cellular polystyrene is frequently used in these applications as well as polyurethanes.

Many packaging applications require a material in tubular form, as for containers; or a hollow cylinder split into longitudinal halves which may be assembled to provide a cylindrical casing for receiving various items of merchandise. Also the split cylinder type of foam may be used as thermal insulation on pipes and heating conduits.

In the past, tubular plastic foam material has been produced by extruding a foamable plastic containing a low boiling point liquid, through an annular die orifice after which the liquid boils to a gas due to the decreased pressure to cause foaming of the plastic and resulting expansion as the extrusion product slides unrestrained across a post extrusion mandrel. This conventional technique produces a tubular foam product having a rough corrugated outer surface due to the uncontrolled foaming and expansion after extrusion.

The present invention provides a new and improved apparatus which eliminates the objections indicated above and affords other advantages heretofore not obtainable.

It is accordingly an important object of the present invention to provide a new and improved apparatus used in making cellular plastic materials wherein the post extrusion expansion of the product is carefully controlled to provide a smooth outer surface, a controlled wall thickness and a low density.

Another object of the invention is to provide an improved apparatus for extruding foamable plastic materials in tubular form wherein the post extrusion expansion of the plastic is closely controlled in an expansion space of increasing transverse cross sectional area.

A still further object of the invention is to provide an improved apparatus for extruding foamable plastic materials in tubular form wherein the foaming and resulting expansion of the material following extrusion is augmented by means of fluid which is forced radially into the material during its expansion.

Other objects of the invention will appear in the following detailed description and appended claims, reference being had to the accompanying drawing forming a part of this specification, which is a longitudinal sectional view of an apparatus embodying the invention for producing foamed or cellular plastic materials in tubular form.

A PERSPECTIVE VIEW OF THE INVENTION

According to the present invention there is provided a new and improved apparatus for extruding cellular or foamed plastic materials in tubular form, including an expansion forming assembly comprising an outer member and an inner member mounted contiguous with the extrusion die and defining therebetween a tubular expansion space communicating with the extrusion orifice. The expansion space is adapted to receive the tubular extrusion and guide it during its axial travel and radial expansion resulting from liquid entrained therein boiling to a gas and foaming the material to form a cellular product of tubular form. The expansion space has an annular transverse cross sectional area which increases gradually in the direction of travel of the extrusion product to shape the material precisely during its expansion.

In accordance with a supplemental aspect of the invention, a foam-augmenting fluid such as hot water, steam, hot air or Freon is forced radially outwardly from the inner member and radially inwardly from the outer member into the foamable material to further expand the extrusion product and provide a lower density cellular plastic.

In accordance with the method of the invention, a foamable plastic material containing a low boiling point liquid is forced through an annular extrusion orifice to form a tubular product. Immediately following extrusion the tubular product is passed through a tubular expansion space having an annlar transverse cross sectional area which increases in the direction of travel of the tubular product to permit controlled expansion during the boiling off of the low boiling point liquid into a gas and resulting foaming. As a supplemental step in the process, a foam augmenting fluid such as hot water, steam, hot air or Freon is forced into the tubular product while in the expansion space.

THE APPARATUS

Referring more particularly to the drawing, there is shown an extrusion apparatus A embodying the invention for producing cellular or foamed plastic materials in tubular form. The apparatus A includes a pressure unit broadly indicated by the numeral 10, for feeding foamable plastic material into an extrusion die broadly indicated by the numeral 12.

The pressure unit 10 includes a screw barrel 14 and an adapter sleeve 16 clamped together in axial alignment, the adapter sleeve having a flange 18 which is bolted to the extruding die 12 by means of machine screws 20. The adjoining ends of the screw barrel 14 and adapter sleeve 16 have radial flanges 22 and 24 which are tightly clamped together by means of a clamp yoke 26. A sealing ring 28 is positioned in a circumferential groove formed in the adjoining interior wall portions of the screw barrel 14, and adapter sleeve 16, to provide a tight seal at this connection.

Mounted within the screw barrel 14 is a rotating screw conveyor 30, which serves to force the foamable plastic material through the screw barrel from a hopper located above (not shown), through a central bore 34 in the adapter sleeve 16 and through the extruding die 12. The threads 36 of the screw conveyor 30 are located closely adjacent to the inner wall of the screw barrel so that plastic material in the space 32 carried between the body of the screw and the screw barrel 14, is forced forwardly under pressure.

The extruding die 12 includes an outer body member 40 having a central bore 42. Coaxially mounted within the bore 42 is a hollow cylindrical mandrel 44. The mandrel 44 is mounted within the outer body member 40 by means of a tubular mandrel-holding collar 46 which is tightly fitted within the bore 42 at the right hand end of the outer member 40, between the member 40 and the mandrel 44. The opposite end of the outer body member 40 and cylindrical mandrel 44 define therebetween a tubular extruding channel 48 communicating with the central bore 34 of the adapter sleeve 16 through a connecting collar 50, mounted in a radial bore in the outer body member 40.

Mounted adjacent to the outer body member 40 and axially aligned with the bore 42 is an outer expansion guide member 52 which defines together with the corresponding longitudinal portion of the hollow cylindrical mandrel 44 an expansion space 54 communicating with the tubular extruding channel 48 and adapted to guide the tubular extruded material after extrusion during its expansion to form a cellular plastic pipe or hollow cylinder. The expansion space 54 has an annular transverse cross sectional area which increases gradually in the direction of travel of the extruded plastic material. The hollow cylindrical mandrel 44 extends beyond the outer expansion guide member 52 to guide the tubular plastic foam to suitable take-off equipment (not shown).

In some applications it may be desirable to slit the tubular foam product into longitudinal halves which may be cut to a desired length and later reassembled to provide a tubular packaging form for various items of merchandise. Accordingly rotatable disc-type slitting knives 56 may be oppositely mounted adjacent to the mandrel 44 if desired, as shown in the drawing. The slitting is necessary of course where the foam product is to be used to insulate pipes and heating conduits. After the halves are assembled around the pipe or conduit, they may be easily fastened together by strap fasteners, tape or other means.

THE FOAM AUGMENTING ASPECT

In order to achieve improved foaming of the plastic within the expansion space 54, means may be provided for forcing a foam-augmenting fluid such as hot water, steam, hot air or Freon into the material during its travel through the expansion space 54. This provides a cellular plastic of a lower density which is desirable for many applications.

Accordingly, as shown in the drawing, the mandrel 44 may be provided with radial bores 60 in the portion defining the expansion space 54 for forcing a fluid radially outwardly into the foamable plastic. The fluid may be supplied to the hollow cylindrical mandrel 44 from an outside source at a point rearwardly of the extruding die 12, the portion of the mandrel 44 forwardly of the expansion space 54 being provided with a wall or baffle 62 to force the fluid to travel outwardly through the bores 60.

The outer expansion guide member 52 may also be used as a means to force foam augmenting fluid radially inwardly into the material in the expansion space by means of circumferential passages 64 providing a manifold, and radial bores 66 communicating between the circumferential passages and the expansion space 54. The fluid may be supplied to the manifold from the same pressure source which supplies the cylindrical mandrel 44.

OPERATION

In the practice of the method of the present invention for which the above described apparatus is adapted, the foamable plastic material is forced by means of the pressure unit 10 into the extruding die 12 and through the tubular extruding channel 48. Immediately after extrusion from the channel 48 the tubular plastic enters the expansion space 54.

Due to the decreased pressure experienced by the foamable plastic in the expansion space 54, the low boiling point liquid entrained in the plastic boils to a gas to foam the material and expand the tubular extrusion in a controlled manner within the confines of the expansion space 54.

To augment the foaming, a suitable fluid may be forced radially outwardly through the radial bores 60 in the mandrel 44 and radially inwardly through the radial bores 66 communicating with the manifold 64 in the outer expansion guide member 52. This increases the degree of foaming and provides a tubular foamed plastic of lower density. The introduction of the augmenting fluid can be considered optional, but useful where lower densities are desired.

Where the foamable material is a thermoplastic resin, the use of hot water, steam, etc., as the foam-augmenting fluid is both suitable and desirable. However, in the case of thermosetting materials such as polyurethanes, steam or hot water would have a damaging effect, and therefore are preferably not used. Accordingly some other inert gaseous material such as Freon is preferred where a foam-augmenting fluid is to be used.

While the present invention has been described with respect to tubular forms, it is subject to logical extension. Thus, other than tubular shapes can be made in accordance with the expanding, controlled-foaming concept. Other shapes would include not only multi-sided tubular shapes, but also flat-sheet shapes as well. Thus the broad scope of the invention encompasses an expansion space of transverse cross-sectional area which increases in size gradually, in the direction of travel of the extruded product, to shape the material precisely during its expansion.

Also the scope of the invention would encompass the production of flat shapes, using the apparatus shown in the drawing. Thus, while still pliable, the expanded material could be cut by the slitting knives 56 and flattened by suitable plate means. Where this is not to be done, a coolant can be applied within the hollow cylindrical mandrel 44, to the left of the baffle 62.

Resins applicable to use in the invention include thermoplastics and a suitable foaming or pore-forming agent. Examples of thermoplastic resins that may be employed include polystyrene polymers. Also, the cellulose ethers and esters, e.g., ethyl cellulose, cellulose acetate; homopolymers and interpolymers of monomeric compounds containing the vinylidene $CH_2=C<$ grouping such as olefins, e.g., ethylene, isobutylene; vinyl halides, e.g., vinyl chloride, vinylidene chloride; vinyl esters of carboxylic acids, e.g., vinyl acetate, vinyl propionate, vinyl butyrate, vinyl benzoate; vinyl ethers, e.g., vinyl methyl ether, vinyl ethyl ether, vinyl isobutyl ether; vinylidene aromatic compounds, e.g., styrene, vinyl toluene; unsaturated carboxylic acids and derivative thereof, e.g. acrylic acid, methacrylic acid, methyl acrylate, ethyl acrylate, methyl methacrylate, acrylamide, acrylonitrile, methacrylonitrile, and interpolymers of the abovementioned vinylidene monomers with unsaturated alpha, beta-polycarboxylic acid and derivatives thereof, e.g., maleic anhydride, diethyl maleate, dibutyl fumarate, diallyl maleate, dipropyl maleate, etc. Also the invention is applicable to rigid, relatively non-elastic thermoplastic resins such as homopolymers and interpolymers of vinyl chloride, homopolymers of vinylidene aromatic compounds, e.g., styrene, o-chlorostyrene, p-chlorostyrene, 2,5 dichlorostyrene, 2,4 dichlorostyrene, p-methylstyrene, p-ethylstyrene, vinyl naphthalene, alphamethylstyrene, and interpolymers of such vinyl aromatic compounds. It is feasible and sometimes desirable to employ a blend of two or more thermoplastic resins such as a blend of polystyrene and a rubbery diene polymer such as natural rubber, butadiene-acrylonitrile rubbers, and the like. High impact polystyrene prepared by polymerizing monomeric styrene in the presence of a rubbery diene polymer also may be employed advantageously.

Also, the autogeneously foamable materials such as polyurethanes can be employed. In this instance, the outer and inner expansion members can be electrically heated to aid in curing the resin. Broadly the invention is applicable to hardenable, extrudable, foamable materials.

Suitable foaming agents for the thermoplastic resins are well-known and the selection of the particular foaming agent to be employed will be dictated largely by the particular thermoplastic resin in which it is to be incorporated. It is preferred to employ as foaming agents non-reactive organic liquids which have not more than a slight solvent action on the thermoplastic resin and which volatilize below the softening point of thermoplastic resins. Examples of suitable foaming agents that may be employed with polystyrene include pentane, hexane, heptane, petroleum ether, cyclopentane, cyclopentadiene, acetone, methanol, methyl acetate, ethyl acetate, methyl formate, ethyl formate, dichloroethylene, isopropyl chloride, propionaldehyde, and diisopropyl ether.

While the invention has been described with respect to a specific embodiment of the apparatus thereof, many variations and modifications will occur to those skilled in the art, which are well within the intended spirit and scope of the invention as defined in the appended claims.

What is claimed is:

1. In an extrusion apparatus for extruding foamable plastic materials in tubular form, and including an annular extrusion orifice, an outer member and an inner member defining therebetween a tubular expansion space communicating with said extrusion orifice and being adapted to guide tubular extruded material for travel therethrough during foaming for controlled expansion thereof, said expansion space having an annular transverse cross-sectional area which increases gradually in the direction of travel of said extruded material, and including means for forcing a fluid radially inwardly from said outer member into said expansion space.

2. An extrusion apparatus as defined in claim 1, wherein said means for forcing a fluid comprises a pressurized fluid source, means defining interconnected circumferential passages in said outer member to form a manifold communicating with said pressurized fluid source, and radial bores communicating between said passages and said expansion space.

References Cited

UNITED STATES PATENTS

| | | |
|---|---|---|
| 2,044,961 | 6/1936 | Waner. |
| 2,537,977 | 1/1951 | Dulmage _____ 264—53 |
| 2,766,480 | 10/1956 | Henning _____ 264—47 |
| 3,170,972 | 2/1965 | Knipp et al. _____ 264—54 XR |
| 3,230,902 | 1/1966 | Grimm et al. |
| 3,265,552 | 8/1966 | Berggren et al. __ 264—146 XR |
| 3,265,786 | 8/1966 | Voelker _____ 264—54 |
| 3,299,192 | 1/1967 | Lux _____ 264—53 |
| 3,309,443 | 3/1967 | Scott et al. |
| 3,339,235 | 9/1967 | Nossol. |

PHILIP E. ANDERSON, Primary Examiner

U.S. Cl. X.R.

18—5; 260—2.5; 264—50, 53, 340